(12) United States Patent
Rajaraman

(10) Patent No.: US 7,973,099 B2
(45) Date of Patent: Jul. 5, 2011

(54) PRE-PROCESSED THERMOPLASTIC COMPOUND

(75) Inventor: Hari Rajaraman, Hudson, OH (US)

(73) Assignee: PolyOne Corporation, Avon Lake, OH (US)

( * ) Notice: Subject to any disclaimer, the term of this patent is extended or adjusted under 35 U.S.C. 154(b) by 97 days.

(21) Appl. No.: 12/446,015

(22) PCT Filed: Oct. 19, 2007

(86) PCT No.: PCT/US2007/081902
§ 371 (c)(1),
(2), (4) Date: Apr. 17, 2009

(87) PCT Pub. No.: WO2008/051828
PCT Pub. Date: May 2, 2008

(65) Prior Publication Data
US 2010/0280150 A1    Nov. 4, 2010

Related U.S. Application Data

(60) Provisional application No. 60/862,513, filed on Oct. 23, 2006.

(51) Int. Cl.
C08K 9/00 (2006.01)
C09D 151/00 (2006.01)
B32B 5/16 (2006.01)

(52) U.S. Cl. ........ 523/201; 523/206; 523/215; 523/220; 428/403; 428/407

(58) Field of Classification Search .................. 523/201, 523/215, 220–221, 203, 205, 206, 209, 213; 428/403, 407, 411.1; 510/188, 208
See application file for complete search history.

(56) References Cited

U.S. PATENT DOCUMENTS

| 4,362,832 A | * | 12/1982 | Locatelli .................. 524/102 |
| 4,759,956 A | * | 7/1988 | Amer et al. .................. 427/213 |
| 5,006,368 A | | 4/1991 | Louks |
| 5,095,049 A | * | 3/1992 | Maeda et al. .................. 523/322 |
| 5,236,649 A | | 8/1993 | Hall et al. |
| 5,248,550 A | | 9/1993 | Turpin et al. |
| 5,306,739 A | | 4/1994 | Lucey |
| 5,316,885 A | | 5/1994 | Sasaki et al. |
| 5,319,001 A | | 6/1994 | Morgan et al. |
| 5,536,576 A | * | 7/1996 | Hishida .................. 428/403 |
| 5,662,963 A | | 9/1997 | Hishida |
| 5,688,449 A | | 11/1997 | Fox |
| 5,919,530 A | | 7/1999 | Hurley et al. |
| 6,124,391 A | | 9/2000 | Sun et al. |
| 6,616,968 B2 | | 9/2003 | Bostrom et al. |
| 6,855,402 B2 | | 2/2005 | Rabinovitch et al. |
| 6,916,770 B2 | | 7/2005 | Nitzsche |
| 2002/0052429 A1 | * | 5/2002 | Weier et al. .................. 523/221 |
| 2004/0043147 A1 | | 3/2004 | Findley |
| 2004/0071936 A1 | | 4/2004 | Martelli |
| 2005/0250879 A1 | * | 11/2005 | Correll et al. .................. 523/221 |

OTHER PUBLICATIONS

Olabisi, Olagoke, "Handbook of Thermoplastics." p. 426, 1997.*
"Acrylic Laquer Conformal Coating." MG Chemicals. p. 1, 2000.*
"Acrylonitrile Butadiene Styrene—ABS." [online] Tangram Technology Ltd, 2001, [retrieved Jan. 5, 2010]. Retrieved from the Internet <URL: htto://www.tangram.com.uk/TI-Polymer-ABS.html>.*

* cited by examiner

*Primary Examiner* — Vasu Jagannathan
*Assistant Examiner* — Hannah Pak
(74) *Attorney, Agent, or Firm* — John H. Hornickel

(57) ABSTRACT

A pre-processed polymer composite is disclosed comprising a heat-sensitive polymer resin particle; particles of colorant or functional additive in association with the heat-sensitive polymer resin particle; and a thermoplastic encapsulant to form a film around the associated polymer and colorant or functional additive particles. The method of making the polymer composite avoids a melting of the heat-sensitive polymer resin particles, which avoids contributing to heat history of the polymer prior to extrusion or molding into the form of the final plastic article.

14 Claims, 3 Drawing Sheets

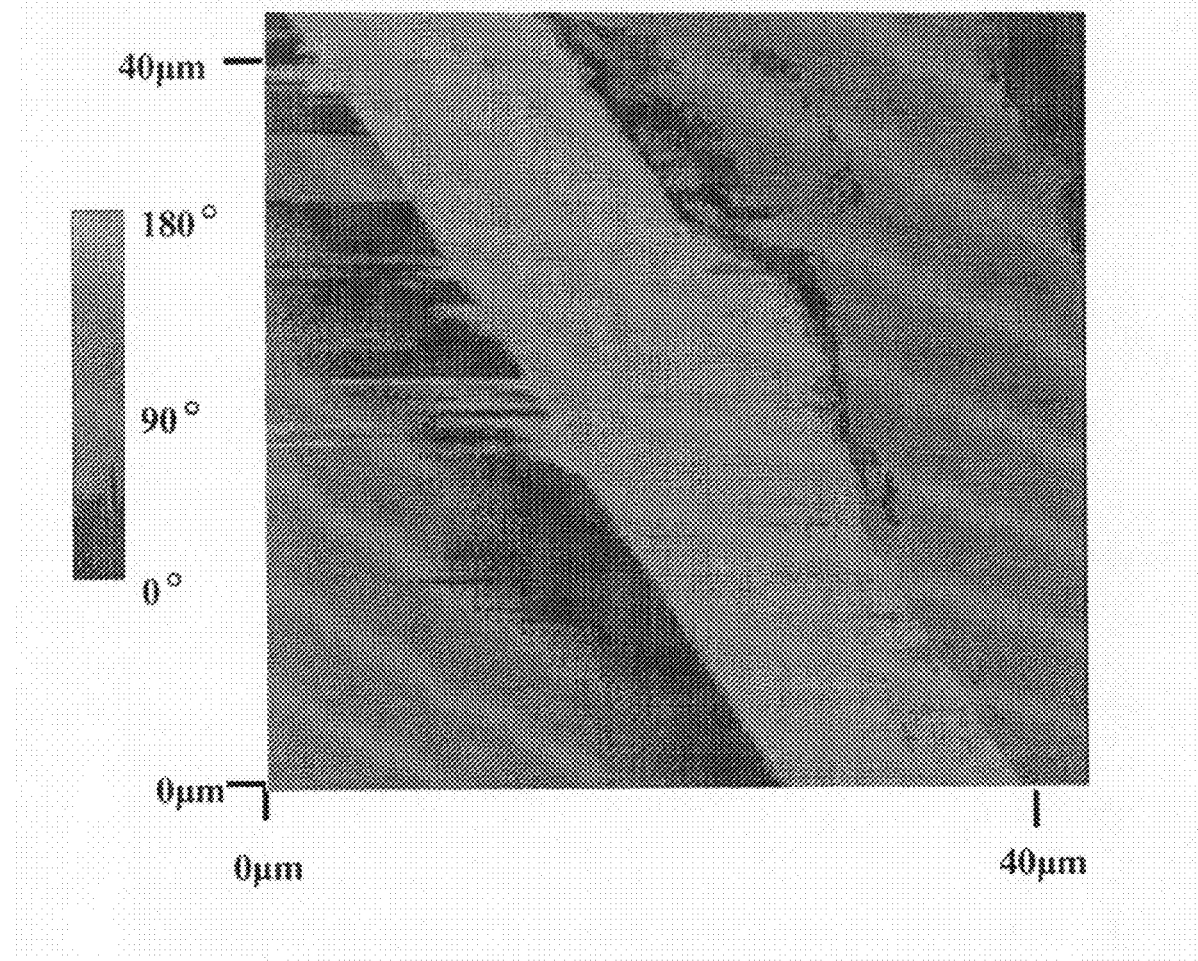

PRE-PROCESSED THERMOPLASTIC COMPOUND

CLAIM OF PRIORITY

This application claims priority from U.S. Provisional Patent Application Ser. No. 60/862,513 filed on Oct. 23, 2006, which is incorporated by reference.

FIELD OF THE INVENTION

This invention relates to pre-colored thermoplastic polymer pellets and methods of making them.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products.

Attracting consumers to purchase individually-sized or family-sized containers includes branding and trade dress. Among the elements of valuable trade dress is the color of the container. Moreover, such color may need to co-exist with translucency, transparency, or other special effects for the bottle.

Currently, pellet-based concentrates, and pre-colored resins are used. But such uses also present problems. Pellet-based concentrates for tint applications have be used at high dilution or "letdown" ratios to achieve good color distribution. Pre-colored resins are expensive to manufacture and warehouse. Such resins also undergo two heat histories (initial compounding and subsequent molding), which can be detrimental to some polymers.

SUMMARY OF THE INVENTION

What the art needs is a pre-processed polymer compound that only undergoes one melting process, at the time of forming the extruded or molded article.

The present invention solves the problem in the art by using a thermoplastic encapsulant to retain colorant or additive particles in association with particles of polymer resin that should not undergo multiple melting steps. Thus, one type of pre-processed polymer compound is a pre-colored polymer compound, and another type of pre-processed polymer compound is a pre-foamed polymer compound containing blowing agent. One can replace colorant or blowing agent with another type of functional additive to create a different category of pre-processed polymer compound.

One aspect of the invention is a polymer composite, comprising: (a) heat-sensitive polymer resin particles; (b) particles of colorant or additive or both in association with the heat-sensitive polymer resin particles; and (c) a thermoplastic encapsulant to form a film around the associated polymer resin particles and colorant or functional additive particles.

"Heat-sensitive polymer resin" means a thermoplastic with a high melting point or a biodegradable character, either of which should not undergo multiple melting steps, selected from the group of thermoplastic polymer resins consisting of polyphenylene sulfide (PPS); polylactic acid (PLA); polycarbonate (PC); aromatic polyesters such as polyethylene terephthalate (PET) and polybutylene terephthalate (PBT); acrylonitrile butadiene styrene (ABS) and combinations thereof.

"Colorant" means dyes or pigments in particulate form.

"Functional additive" means particles of materials, other than colorants, that alter the physical or chemical properties of the heat-sensitive polymer resins in a desired manner.

"Thermoplastic encapsulant" means a film-forming thermoplastic polymer resin or compound that can encapsulate colorant particles in association with the heat-sensitive polymer resin. Non-limiting examples of film-forming thermoplastic resins or compounds are binders such as aqueous acrylate-based polymers.

One feature of the present invention is that the colorant particles and the heat-sensitive polymer can be dry-blended together as a first step before a second step of encapsulation of them by the thermoplastic binder. Neither step occurs at a temperature sufficient to melt the heat-sensitive polymer resin.

Other features will become apparent from a description of the embodiments of the invention.

BRIEF DESCRIPTION OF DRAWING

FIG. 3 is a photograph of the cross-section of a third sample of the embodiment of FIG. 1.

EMBODIMENTS OF THE INVENTION

Heat-Sensitive Thermoplastic Polymer Resin

Figure 1:
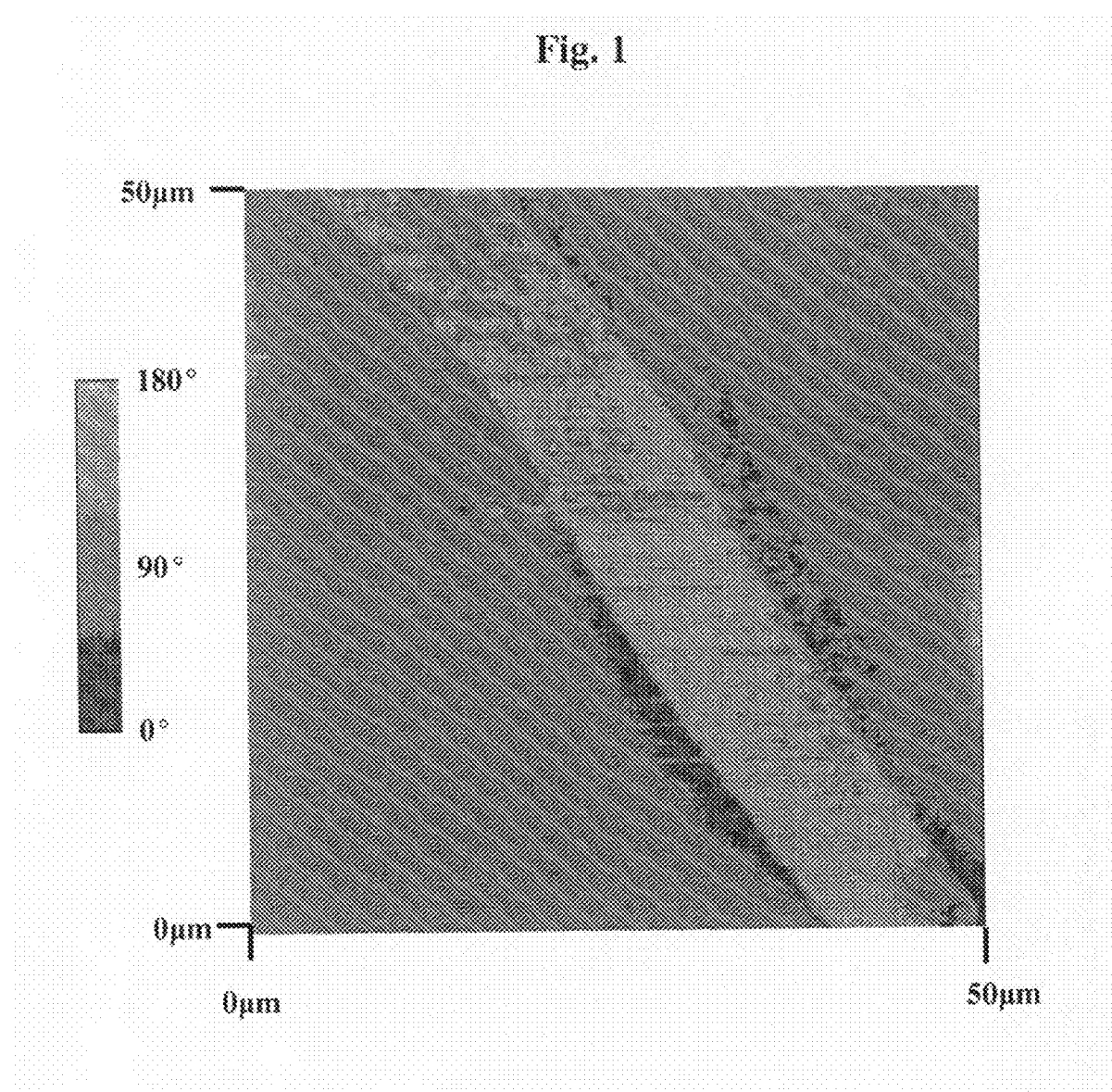
FIG. 1 is a photomicrograph of the cross-section of a polycarbonate pellet coated with titanium dioxide, serving as a colorant, and overcoated with a film-forming aqueous acrylate polymer, serving as a thermoplastic encapsulant, according to the present invention.

As mentioned above, the resin can be selected from the group of thermoplastic polymer resins consisting of polyphenylene sulfide (PPS); polylactic acid (PLA); polycarbonate (PC); aromatic polyesters such as polyethylene terephthalate (PET) and polybutylene terephthalate (PBT), acrylonitrile butadiene styrene (ABS) and combinations thereof.

The resin can have a weight average molecular weight ranging from about 3000 to about $3 \times 10^6$, and preferably from about 50,000 to about 500,000.

The resin can have a glass transition temperature ranging from about −30 to about 300° C., and preferably from about 50° C. to about 200° C.

The resin can have a particle size ranging from about 10 to about 10,000 microns, and preferably from about 500 to about 5000 microns.

Non-limiting examples of commercially available heat-sensitive thermoplastic resins include: PLA 4042D made by Nature Works LLC, Makrolon 2658(PC) available from Bayer Materials Science, Pulse 2000 (ABS/PC blend) made by Dow, 9921(PET) from Voridian, Valox 325 (PBT) made by GE Plastics, grades of Ryton (PPS) manufactured by CP Chemicals.

Colorant

As explained above, colorant can be a pigment, a dye, a combination of pigments, a combination of dyes, a combination of pigments and dye, a combination of pigment and dyes, or a combination of pigments and dyes. The choice of colorants depends on the ultimate color desired by the designer for the plastic article.

The science of color is well known to those skilled in the art. Without undue experimentation, one can use color matching techniques to identify a particular location in spherical color space. For example, one skilled in the art can use the teachings of PCT Patent Application US2004/012233 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Bayer, Ciba-Geigy, Color-Chem International, Sun Chemical, Zhuhai Skyhigh Chemicals, and others identified at Internet Web Sites such as http://www.colorpro.com/info/vendors/colorant.html and http://dir.yahoo.com/Business_and_Economy/Business_to_Business/Chemicals_and_Allied_Products/Pigments_and_Dyes/

Table 1 lists 51 commercially available pigment colorants in a variety of primary and secondary colors, 47 chromatics, 3 blacks, and 1 white.

TABLE 1

Commercial Pigment Colorants

| Raw Material Name | CI_Name | Family | COLOR | FDA* |
|---|---|---|---|---|
| TIOXIDE R-FC6 WHITE TiO$_2$ | PIGMENT WHITE 6 | INORGANIC | WHITE | Y |
| REGAL 660R BLACK POWDER | PIGMENT BLACK 7 | ORGANIC | | N |
| MPC CHANNEL BLACK | PIGMENT BLACK 7 | ORGANIC | | Y |
| BK-5099 BLACK OXIDE | PIGMENT BLACK 11 | INORGANIC | | N |
| HELIOGEN BLUE K7090 | PIGMENT BLUE 15:3 | ORGANIC | BLUE | Y |
| Heliogen Blue K6903 | PIGMENT BLUE B 15:1 | ORGANIC | BLUE | Y |
| 34L2000 AZURE BLUE | PIGMENT BLUE 28 | INORGANIC | BLUE | Y |
| 34L2001 AMAZON BLUE | PIGMENT BLUE 36 | INORGANIC | BLUE | N |
| NUBIX G-58 ULTRAMARINE BLUE | PIGMENT BLUE 29 | INORGANIC | BLUE | Y |
| NUBIX C-84 ULTRAMARINE BLUE | PIGMENT BLUE 29 | INORGANIC | BLUE | Y |
| NUBIX E-28 ULTRAMARINE BLUE | PIGMENT BLUE 29 | INORGANIC | BLUE | Y |
| HELIOGEN GREEN K-8730 | PIGMENT GREEN 7 | ORGANIC | GREEN | Y |
| HELIOGEN GREEN K 8605 | PIGMENT GREEN 7 | ORGANIC | GREEN | Y |
| CHROMIUM OXIDE GREEN G-6099 | PIGMENT GREEN 17 | INORGANIC | GREEN | Y |
| CROMOPHTAL ORANGE GP | PIGMENT ORANGE 64 | ORGANIC | ORANGE | Y |
| 2920 BRILLIANT ORANGE | PIGMENT ORANGE 79 | ORGANIC | ORANGE | Y |
| NOVAPERM RED F5RKA | PIGMENT RED 170 | ORGANIC | RED | N |
| 225-2480 Sunbrite Scarlet 60:1 | Pigment Red 60:1 | ORGANIC | RED | N |
| IRGALITE RED LCB | PIGMENT RED 53:1 | ORGANIC | RED | N |
| DCC-2782 Barium 2B Red | Pigment Red 60:1 | ORGANIC | RED | N |
| Lithol Scarlet 4451 | Pigment Red 48:2 | ORGANIC | RED | N |
| CROMOPHTAL RED 2020 | PIGMENT VIOLET 19 | ORGANIC | RED | Y |
| CROMOPHTAL MAGENTA P | PIGMENT RED 202 | ORGANIC | RED | Y |
| CROMOPHTAL PINK PT | PIGMENT RED 122 | ORGANIC | RED | N |
| PALIOGEN RED K 3911 HD | PIGMENT RED 178 | ORGANIC | RED | Y |
| CROMOPHTAL RED 2030 | PIGMENT RED 254 | ORGANIC | RED | Y |
| CROMOPHTAL RED 2028 | PIGMENT RED 254 | ORGANIC | RED | Y |
| Colortherm Red 110M | PIGMENT RED 101 | INORGANIC | RED | Y |
| Colortherm Red 130M | PIGMENT RED 101 | INORGANIC | RED | Y |
| Colortherm Red 180M | PIGMENT RED 101 | INORGANIC | RED | Y |

TABLE 1-continued

Commercial Pigment Colorants

| Raw Material Name | CI_Name | Family | COLOR | FDA* |
|---|---|---|---|---|
| CINQUASIA VIOLET RT-891-D | PIGMENT VIOLET 19 | ORGANIC | VIOLET | Y |
| CROMOPHTAL VIOLET GT | PIGMENT VIOLET 23 | ORGANIC | VIOLET | N |
| PREMIER VU UMV (6112) | PIGMENT VIOLET 15 | INORGANIC | VIOLET | Y |
| SICOTAN BROWN K 2750 FG | PIGMENT YELLOW 164 | INORGANIC | BROWN | N |
| FERRITAN FZ-1000 | PIGMENT YELLOW 119 | INORGANIC | Tan | Y |
| NUBITERM Y-905K ZINC FERRITE | PIGMENT YELLOW 119 | INORGANIC | Tan | Y |
| PV FAST YELLOW HG | PIGMENT YELLOW 180 | ORGANIC | YELLOW | Y |
| IRGALITE YELLOW WGPH | PIGMENT YELLOW 168 | ORGANIC | YELLOW | N |
| PV FAST YELLOW HGR (11-3071) | PIGMENT YELLOW 191 | ORGANIC | YELLOW | Y |
| PALIOTOL YELLOW K 2270 | PIGMENT YELLOW 183 | ORGANIC | YELLOW | Y |
| CROMOPHTAL YELLOW HRPA | PIGMENT YELLOW 191:1 | ORGANIC | YELLOW | Y |
| CROMOPHTAL YELLOW GRP | PIGMENT YELLOW 95 | ORGANIC | YELLOW | Y |
| IRGALITE YELLOW WSR-P | PIGMENT YELLOW 62 | ORGANIC | YELLOW | N |
| CROMOPTHAL YELLOW 3RLP | PIGMENT YELLOW 110 | ORGANIC | YELLOW | Y |
| 9766 FD&C YELLOW # 6 | PIGMENT YELLOW 104 | ORGANIC | YELLOW | Y |
| 9765 FD&C YELLOW # 5 | PIGMENT YELLOW 100 | ORGANIC | YELLOW | Y |
| PALIOTOL YELLOW K 0961 (HD) | PIGMENT YELLOW 138 | ORGANIC | YELLOW | Y |
| SICOPLAST YELLOW 10-0770 | PIG YEL 138/ PIG YEL 183 | ORGANIC | YELLOW | Y |
| SICOTAN YELLOW K 2001 FG | PIGMENT BROWN 24 | INORGANIC | YELLOW | Y |
| SICOTAN YELLOW K 1011 | PIGMENT YELLOW 53 | INORGANIC | YELLOW | Y |
| COLORTHERM 10 | PIGMENT YELLOW 42 | INORGANIC | YELLOW | Y |

*As publicized by the commercial producer or as tested by the applicant, or both.

Table 2 shows 14 commercially available dyes.

TABLE 2

Commercial Dye Colorants

| Raw Material Name | CI Name | Family | Color | FDA* |
|---|---|---|---|---|
| Lambdaplast Blue NL | Solvent Blue 59 | Anthraquinone | Blue | N |
| Macrolex Blue RR Granular | Solvent Blue 97 | Anthraquinone | Blue | N |
| Macrolex Green G Granular | Solvent Green 28 | Anthraquinone | Green | N |
| Macrolex Green 5B Granular | Solvent Green 3 | Anthraquinone | Green | N |
| Macrolex Orange R Granular | Disperse Orange 47 | Polymethine | Orange | N |
| Macrolex Orange 3G Granular | Solvent Orange 60 | Perinone | Orange | N |
| Macrolex Red EG Granular | Solvent Red 135 | Perinone | Red | N |
| Macrolex Red E2G Granular | Solvent Red 179 | Perinone | Red | N |
| Thermoplast Red 454 | Solvent Red 195 | Anthraquinone | Red | N |
| Macrolex Red Violet R Granular | Disperse Violet 26 | Anthraquinone | Violet | N |
| Macrolex Violet B Granular | Solvent Violet 13 | Anthraquinone | Violet | N |
| Macrolex Violet 3R Granular | Solvent Violet 36 | Anthraquinone | Violet | N |
| Key Plast Yellow 3G | Solvent Yellow 93 | Pyrazolone | Yellow | N |
| Key Plast Yellow AG | Solvent Yellow 114 | Quinophthalone | Yellow | N |

*As publicized by the commercial producer or as tested by the applicant, or both.

Colorants can include colorants intended for transparent or translucent plastic articles, although colorants intended for opaque plastic articles are not excluded from consideration.

Achievement of a color match of a plaque with a desired color from the creativity of a designer or a pre-arranged color standard such as Pantone® color standards from an inventory of commercially available colorants is relatively straightforward for a skilled color matcher, even if a few iterations are required to satisfy the customer.

The colorant for use in the invention can have a particle size ranging from about 0.01 to about 10,000 microns, and preferably from about 0.1 to about 1000 microns.

Frequently, the preparation of a colored plastic article does not involve merely color but also special effect features, such as Granite, Translucent, Pearls, Metallics, Fluorescents, Iridescents, Marbles, etc.

Non-limiting examples of such additives are commercially available from PolyOne Corporation of Avon Lake, Ohio, USA (www.polyone.com) and marketed under the following brands: OnColor FX colorants, PolyOne colorants, etc.

Functional Additives

Additives to improve processing or performance of the final compound, can be added according to preferences of this skilled in the art. For example, functional additives can include anti-oxidants, anti-stats, acetaldehyde scavengers, surfactants, biocides, exfoliated nanoclays, and the like. Generally, minor amounts of such additives provide improvement of performance to the compound during processing or in performance by the molded article after manufacturing. One skilled in the art without undue experimentation can determine the appropriate concentration.

Blowing agents are sometimes desired to aid in foaming the resulting polymer composite for density reduction, improved mold filling and reduction of sink marks in injection molding. There are two major classes of blowing agents endothermic and exothermic. Commercial examples of endothermic blowing agents are products sold under the trade name Safoam by Reedy International, Hydrocerol by Clariant, Unicell C series by Dongjin Semichem. Commercial examples of exothermic blowing agents are Celogen series from Chemtura Corporation, Unicell D series from Dongjin Semichem. A blowing agent based on phenyltriazole chemistry is suitable for high temperature polymers like PC, PBT, glass filled polymers. Commercial examples include Celogen 5PT from Chemtura and Unicell 5PT from Dongjin Semichem.

Plastic articles exposed to natural sunlight are exposed to ultraviolet rays that can harm the color of the article. Therefore, it is customary but not required to include ultraviolet light stabilizers in a thermoplastic compound. The ultraviolet stabilizer also helps protect the polymer resin from adverse effects arising from exposure to the ultraviolet rays.

Commercially available stabilizers are well known to those skilled in the art and include thermal stabilizers and Tinuvin brand stabilizers from Ciba-Geigy of Berne, Switzerland. Of the choice of stabilizers, Tinuvin brand stabilizers are preferred, particularly Tinuvin 234 stabilizer.

In the present invention, the functional additive such as a blowing agent can replace the colorant in the compound or be included with the colorant in the compound.

Thermoplastic Encapsulant

Thermoplastic encapsulants can be solvent-based liquid emulsions or solutions of various film-forming polymers that are introduced into a vessel containing a dry blend of the particles of heat-sensitive polymer resin associated with particles of colorant.

Solvents can range from water to xylene to any other liquid which has a sufficient vapor pressure under suitable processing conditions to evacuate the vessel, leaving a film-forming thermoplastic encapsulant on the dry blend of resin particles-colorant particles. Preferably for environmental reasons, the solvent is water.

As mentioned above, acrylate-based polymer emulsions that are capable of forming films are suitable for the present invention. Non-limiting examples include emulsions made by Noveon under the trade name Carbopol, Joncryl from Johnson Polymer, Rovace from Rohm and Haas, Esicryl from Cook Composites and Chemicals can be used. Also, aqueous dispersions of biopolymers made by companies like FMC Biopolymer can be used. Preferably, the thermoplastic encapsulant is a styrene/acrylate copolymer of the following type: Joncryl 1695 manufactured by Johnson Polymer. This product is a water based translucent emulsion of styrene-acrylate copolymer and is zinc free and very heat stable. It has a solids concentration of about 38%. Joncryl 1695 has a minimum film forming temperature (MFFT) of less than 5° C., low levels of VOC and has broad acceptability in FDA applications. A suitable grade of biopolymer is Aquacoat® ECD 30 ethyl cellulose aqueous dispersion manufactured by FMC Biopolymer. This has a solids loading of around 30% and is expected to be fully bio-degradable.

While not being limited to any particular theory, it is believed that multiple colorant particles have affinity for a resin particle in the dry blend until such time as all particles are enveloped by a film-formed coating of the thermoplastic encapsulant. In such manner, the cluster of affiliated resin particle/colorant particles are a discontinuous phase in a continuous phase of thermoplastic encapsulant. The continuous phase can be self-contained as a single sphere, associated with other spheres in aggregates or agglomerates or a continuous mass in which isolated, discrete clusters of resin particle/colorant particles reside.

Therefore, preferably, the thermoplastic encapsulant is made of a polymer or polymers that is/are translucent or transparent in the visible spectrum, allowing the colorant particles to be seen through the encapsulant shell or continuous mass formed about each cluster of resin particle/colorant particles.

Table 3 shows a chart of acceptable, desirable, and preferable concentrations of ingredients to make polymer composites of the present invention.

TABLE 3

| Ingredient (Wt. %) | Acceptable Range | Desirable Range | Preferred Range |
|---|---|---|---|
| Heat-Sensitive Polymer Resin | 40-99 | 70-99 | 90-99 |
| Colorant or Additive or Both | 0.0001-10 | 0.005-5 | 0.01-1 |
| Thermoplastic Encapsulant (Solids Content) | 0.1-5 | 0.3-3 | 0.5-2 |

The solids content of the thermoplastic encapsulant permits an understanding of the final polymer composite. Usually, the commercially available thermoplastic film-forming liquids contain from 20 to 60% solids (weight percent) and preferably 30-50% solids, and 50-70% of the liquid needs to be removed to permit the encapsulation of colorants and additives on the resin.

Making the Polymer Composite

The clusters of resin particle/colorant particles are made dry-blending the relative proportions of the two types of particles in varied mixing equipment such as a ribbon blender, a paint shaker, or a Henschel mixer.

Agitation can range from about 10 rpm to about 1000 rpm, and preferably from 50 to about 500 rpm Heat can range from about 20° C. to about 50° C. and preferably from about 30° C. to about 40° C.

Mixing times can range from about 1 to about 30 minutes and preferably from about 5 to about 10 minutes The various clusters are encapsulated by placing the dry-blended clusters and the liquid thermoplastic encapsulant in a drying vessel that can be heated or depressurized, or both, to evacuate the liquid from the encapsulant in order to form a coating around each cluster or a continuous phase of thermoplastic encapsulant within which discontinuous clusters of associated resin and colorant particles reside. Forced air convection or vacuum ovens can be used to dry small quantities in the laboratory. Commercially available dryers can used to perform this task during manufacturing. Non limiting examples are fluid bed dryers, rotary vacuum dryers, double cone vacuum dryers, jacketed, vacuum Nauta™ type dryers.

Agitation can range from about 3 to about 300 rpm, and preferably from about 10 to about 100 rpm.

Heat can range from about 50° C. to about 150° C., and preferably from about 70° C. to about 100° C.

Partial vacuum pressures can range from about 1.5 torr to about 75 torr, and preferably from about 3 to about 20 torr.

Drying times can range from about 5 minutes to about 3 hrs and preferably from about 10 minutes to about 1 hr.

After removal of liquid in a dryer, the polymer composite can be packaged for later extrusion or molding into desired plastic articles. Because the formation of the polymer composite has not occurred at a temperature at which the heat-sensitive polymer resin would have melted, the extrusion or molding of the pellets into a polymer article will have been the first time the polymer composite had its fundamental polymer melted. Therefore, rheology of the polymer composite has been controlled to a single heat history during final article formation, while also imparting color to that heat-sensitive polymer resin prior to final article formation.

Other embodiments appear in the examples.

EXAMPLES

Examples 1-8 were made using the ingredients, process steps, and were tested, all as stated in Table 4. To make the pellets, the heat sensitive polymer resin and colorant or additive were mixed in a paint shaker. Then encapsulant was added and mixed again in the paint shaker to form the pre-processed compound pellets. The pellets were dried in a convection oven. The pellets were then molded in an injection molder into plaques for color and color distribution or additive performance observation.

Examples 5 and 7 also included pearlescent pigment additives mixed in with the polymer and colorant. Examples 6 and 7 are fully biodegradable pre-processed color compound pellets.

There was no color rub off from the dried pellets and they looked like "extruded" pre-colored thermoplastic materials.

TABLE 4

Ingredients, Processing, and Results

| | Example | | | | | | | |
|---|---|---|---|---|---|---|---|---|
| | 1 | 2 | 3 | 4 | 5 | 6 | 7 | 8 |
| Polymer Type | Makrolon 2658 PC | Makrolon 2658 PC | PLA 4042D | PLA 4042D | PLA 4042D | PLA 4042D | PLA 4042D | Pulse 200 ABS/PC |
| Polymer Amount (grams) | 454 | 454 | 454 | 454 | 454 | 454 | 454 | 454 |
| Colorant Type | $TiO_2$ | Thermoplast F084 Green Gold | Macrolex Red EG | Macrolex Blue RR | Macrolex Blue RR | Macrolex Blue RR | Macrolex Blue RR | |
| Colorant Amount (grams) | 2.27 | 2.27 | 0.1 | 0.1 | 0.2 | 0.2 | 0.2 | |
| Additive Type (Blowing Agent) | | | | | | | | Unicell 5PT |
| Additive Amount (grams) | | | | | | | | 4.54 |
| Pearlescent Type | | | | | Iriodin 153 | | Iriodin 110 | |
| Pearlescent Amount (grams) | | | | | 1.8 | | 2.27 | |
| Mixing Time in Paint Shaker (mins.) | 2 | 2 | 2 | 2 | 2 | 2 | 2 | 2 |
| Encapsulant Type | Joncryl 1965 | Joncryl 1965 | Joncryl 1965 | Joncryl 1965 | Joncryl 1965 | Aquacoat ECD 30 | Aquacoat ECD 30 | Joncryl 1965 |
| Encapsulant Amount (grams) | 4.54 | 4.54 | 2.27 | 2.27 | 3 | 2.27 | 3 | 3 |
| Mixing Time in Paint Shaker (mins.) | 3 | 3 | 3 | 3 | 3 | 3 | 3 | 3 |
| Forced Convection Oven Temperature | 80° C. | 80° C. | 60° C. | 60° C. | 60° C. | 60° C. | 60° C. | 80° C. |
| Product Form After Dry Blending and Encapsulating | Coated Pellets | Coated Pellets | Coated Pellets | Coated Pellets | Coated Pellets | Coated Pellets | Coated Pellets | Coated Pellets |
| Injection Molder Type | Boy 22S | Boy 22S | Cincinnati Millacron 30T | Cincinnati Millacron 30T | Cincinnati Millacron 30T | Cincinnati Millacron 30T | Cincinnati Millacron 30T | Boy 22S |

TABLE 4-continued

Ingredients, Processing, and Results

| | Example | | | | | | | |
|---|---|---|---|---|---|---|---|---|
| | 1 | 2 | 3 | 4 | 5 | 6 | 7 | 8 |
| Injection Molding Temperature | 300° C. | 300° C. | 205° C. | 205° C. | 205° C. | 205° C. | 205° C. | 300° C. |
| Product Form of Molded Article | Colored Plaque | Colored Plaque | Colored Plaque | Colored Plaque | Colored Plaque | Colored Plaque | Colored Plaque | Foamed Plaque |
| Color | Bright White | Transparent Green | Red | Blue | Blue | Blue | Blue | |
| Color Distribution | Excellent | Excellent | Very Good | Very Good | Very Good | Very Good | Very Good | |
| Additive Performance | | | | | | | | Foamed Product |

Examples 1-8 demonstrate that one can make colored-filled or additive-filled thermoplastic compounds of heat sensitive polymer resins that are molded into (a) colored or pearlescent colored articles that have very good or excellent color distribution or (b) foamed injection molded articles. Because the filled thermoplastic compounds are not subjected to melting in the step of adding color or additives such as blowing agents, the heat-sensitive polymer resins undergo only one heat history, at the time of molding into the final article.

Figure 2:
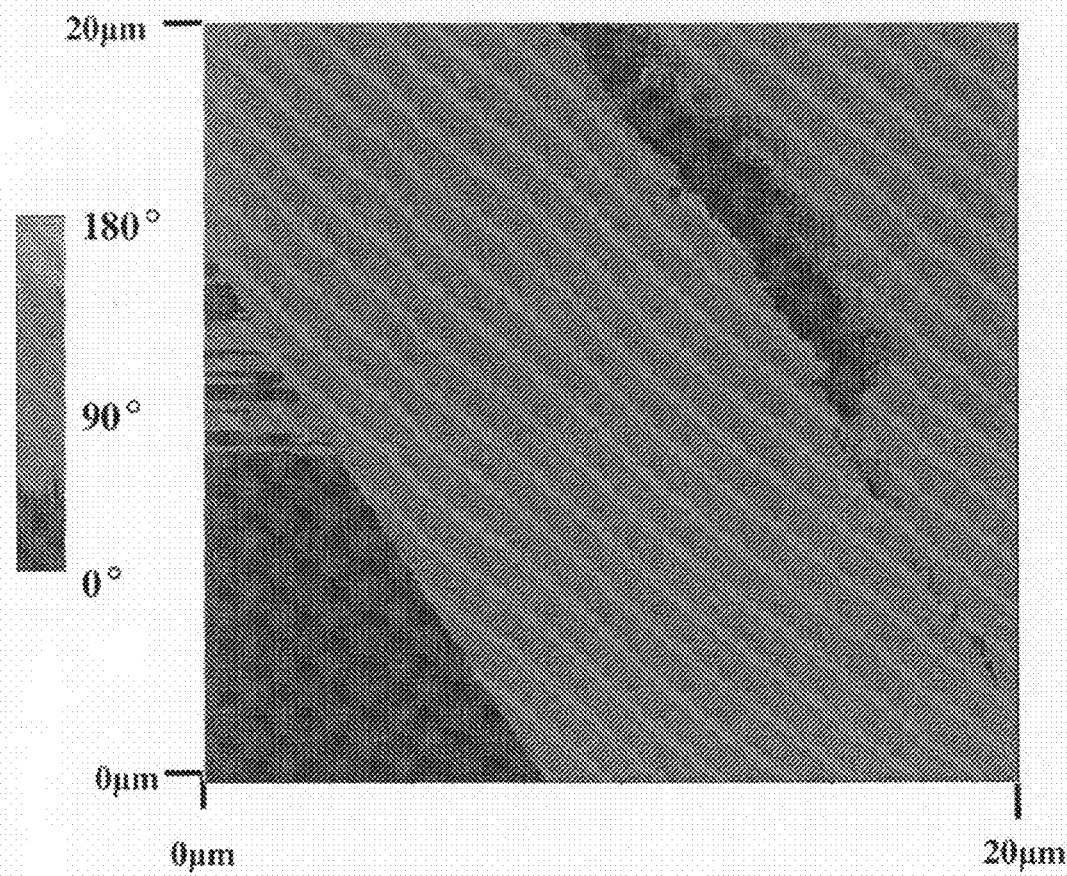
FIG. 2 is a photograph of the cross-section of a second sample of the embodiment of FIG. 1.

FIGS. 1-3 show the morphology of three different samples of the Example 1 formulation of the polymer composite of the present invention. It appears that the $TiO_2$ coating is very uniform across the pellet surface and is about 10 micrometers thick.

The invention is not limited to the above embodiments. The claims follow.

What is claimed is:

1. A polymer composite, comprising:
    (a) heat-sensitive polymer resin particles;
    (b) particles of colorant or functional additive or both in association with the heat-sensitive polymer resin particles; and
    (c) a thermoplastic encapsulant to form a film around the associated polymer resin particles and colorant or additive particles,
    wherein the heat-sensitive polymer resin particles have a particle size ranging from about 500 to about 5,000 microns,
    wherein the colorant can have a particle size ranging from about 0.01 to about 10,000 microns,
    wherein the particles of heat-sensitive polymer resin particles and the particles of colorant or additive or both are affiliated as clusters of a discontinuous phase in a continuous phase of the thermoplastic encapsulant, and
    wherein the thermoplastic encapsulant has a solids content and is an emulsion of a styrene/acrylate copolymer or an aqueous dispersion of a biopolymer, wherein the solids content of the emulsion or the dispersion ranges from about 20 to about 60 weight percent.

2. The composite of claim 1, wherein the heat-sensitive polymer resin is selected from the group consisting of polyphenylene sulfide (PPS); polylactic acid (PLA); polycarbonate (PC); polyethylene terephthalate (PET); polybutylene terephthalate (PBT); acrylonitrile butadiene styrene (ABS) and combinations thereof.

3. The composite of claim 1, wherein the heat-sensitive polymer resin has a weight average molecular weight ranging from about 3000 to about $3 \times 10^6$.

4. The composite of claim 1, wherein the heat-sensitive polymer resin has a glass transition temperature ranging from about −30 to about 300° C.

5. The composite of claim 1, wherein the colorant comprises a pigment, a dye, a combination of pigments, a combination of dyes, a combination of pigments and dye, a combination of pigment and dyes, or a combination of pigments and dyes.

6. The composite of claim 1, wherein the colorant is organic or inorganic.

7. The composite of claim 1, wherein the thermoplastic encapsulant can be a solvent-based liquid emulsion or a solution of film-forming polymer.

8. The composite of claim 1, wherein the thermoplastic encapsulant is translucent or transparent in the visible spectrum.

9. The composite of claim 1, wherein the functional additive is selected from the group consisting of anti-oxidants, anti-stats, acetaldehyde scavengers, blowing agents, surfactants, biocides, exfoliated nanoclays, ultraviolet stabilizers, and combinations of them.

10. The composite of claim 1, wherein the composite further comprises optional special effect features selected from the group consisting of granite, translucent, pearls, metallics, fluorescents, iridescents, marbles, and combinations of them.

11. The composite of claim 1, wherein heat-sensitive polymer resin particles comprise from about 40 to about 99 weight percent of the composite, wherein the colorant particles or additive particles or both comprise from about 0.0001 to about 10 weight percent of the composite, and wherein the thermoplastic encapsulant solids content comprises from about 0.1 to about 5 weight percent of the composite.

12. A method of making a polymer composite of claim 1, comprising the steps of
    (a) mixing heat-sensitive polymer resin particles and particles of colorant, additive, or both at a temperature below the melting point of the polymer resin particles to form a dry blend of mixed particles; and
    (b) mixing the dry blend of particles with a thermoplastic encapsulant at a temperature below the melting point of the polymer resin particles to form an encapsulated, dry blended particle mixture.

13. The method of claim 12, further comprising step (c) of drying the encapsulated dry blended particle mixture at a temperature below the melting point of the polymer resin particles.

14. The method of claim 13,
wherein the mixing of both steps (a) and (b) comprises agitation in a range of from about 10 rpm to about 1000 rpm for mixing times ranging from about 1 to about 30 minutes and wherein the drying of step (c) ranges in temperature from about 20° C. to about 50° C.

* * * * *